US 11,479,241 B1

(12) United States Patent
Subosits et al.

(10) Patent No.: US 11,479,241 B1
(45) Date of Patent: Oct. 25, 2022

(54) VEHICLE STABILIZATION SYSTEM AND METHOD USING CLUTCH-KICK MANEUVER

(71) Applicant: Toyota Research Institute, Inc., Los Altos, CA (US)

(72) Inventors: John Subosits, Menlo Park, CA (US); Yan Ming Jonathan Goh, Palo Alto, CA (US); Michael Thompson, San Juan Capistrano, CA (US); Alexander R. Green, Redwood City, CA (US); Avinash Balachandran, Sunnyvale, CA (US)

(73) Assignee: Toyota Research Institute, Inc., Los Altos, CA (US)

(*) Notice: Subject to any disclaimer, the term of this patent is extended or adjusted under 35 U.S.C. 154(b) by 0 days.

(21) Appl. No.: 17/219,070

(22) Filed: Mar. 31, 2021

(51) Int. Cl.
*B60W 10/02* (2006.01)
*B60W 30/09* (2012.01)
(Continued)

(52) U.S. Cl.
CPC ............ *B60W 30/09* (2013.01); *B60W 10/02* (2013.01); *B60W 10/04* (2013.01); *B60W 10/11* (2013.01); *B60W 10/18* (2013.01); *B60W 30/045* (2013.01); *B60W 30/18145* (2013.01); *B60W 2510/207* (2013.01); *B60W 2520/06* (2013.01); *B60W 2520/125* (2013.01);
(Continued)

(58) Field of Classification Search
CPC ...... B60W 30/09; B60W 10/02; B60W 10/04; B60W 10/11; B60W 10/18; B60W 2710/021; B60W 2710/1005; B60W 2710/18; B60W 10/10; B60W 2510/207; B60W 2520/14; B60W 30/02; B60W 30/045; B60W 30/18145; B60W 2520/125
USPC ........................................................... 701/72
See application file for complete search history.

(56) References Cited

U.S. PATENT DOCUMENTS

| 5,183,131 A | 2/1993 | Naito |
| 5,259,476 A | 11/1993 | Matsuno et al. |
| 5,742,917 A | 4/1998 | Matsuno |

(Continued)

FOREIGN PATENT DOCUMENTS

| DE | 102015219382 A1 * | 4/2017 |
| EP | 3901021 A1 * | 10/2021 |

OTHER PUBLICATIONS

Dobie, "BMW M3 and M4 specs, prices, pictures and Detroit show video," Feb. 10, 2021, 10 pages, found at: https://www.evo.co.uk/bmw/3-series/13641/bmw-m3-and-m4-specs-prices-pictures-and-detroit-show-video (last accessed Mar. 31, 2021).

(Continued)

*Primary Examiner* — Roger L Pang
(74) *Attorney, Agent, or Firm* — Christopher G. Darrow; Darrow Mustafa PC

(57) ABSTRACT

System, methods, and other embodiments described herein relate to stabilizing a vehicle. In one embodiment, a method for stabilizing a vehicle with a drivetrain having a clutch includes obtaining data indicating one or more aspects of a turning condition of the vehicle, detecting that a hazard state exists based on a comparison of one or more parameters of the turning condition against one or more predetermined thresholds, and executing a clutch kick in response to detecting the hazard state. The clutch kick includes disengaging the clutch and rapidly reengaging the clutch.

17 Claims, 6 Drawing Sheets

(51) Int. Cl.
  B60W 10/11    (2012.01)
  B60W 10/18    (2012.01)
  B60W 10/04    (2006.01)
  B60W 30/045   (2012.01)
  B60W 30/18    (2012.01)

(52) U.S. Cl.
  CPC ... *B60W 2520/14* (2013.01); *B60W 2710/021* (2013.01); *B60W 2710/1005* (2013.01); *B60W 2710/18* (2013.01); *F16D 2500/108* (2013.01); *F16D 2500/10412* (2013.01); *F16D 2500/3102* (2013.01); *F16D 2500/3128* (2013.01)

(56) References Cited

U.S. PATENT DOCUMENTS

| | | |
|---|---|---|
| 7,018,321 B2 | 3/2006 | Claar et al. |
| 8,924,114 B2 | 12/2014 | Matsuno et al. |
| 2004/0140174 A1 | 7/2004 | Kano et al. |
| 2004/0147366 A1 | 7/2004 | Aoki et al. |
| 2006/0100062 A1 | 5/2006 | Goto et al. |
| 2018/0362029 A1* | 12/2018 | Carpenter ............. F16D 48/066 |
| 2019/0176801 A1* | 6/2019 | Ruybal .................... B60K 6/52 |
| 2020/0290596 A1 | 9/2020 | Birch et al. |
| 2020/0361465 A1* | 11/2020 | Kim ......................... B60K 1/00 |
| 2021/0078585 A1* | 3/2021 | Collins ................. B60W 20/15 |
| 2022/0024451 A1* | 1/2022 | Park ................. B60W 60/0016 |

OTHER PUBLICATIONS

Unknown, "The BMW Media Information: The New BMW M2 Coupe," 25 pages (2015).

\* cited by examiner

VEHICLE STABILIZATION SYSTEM AND METHOD USING CLUTCH-KICK MANEUVER

TECHNICAL FIELD

The subject matter described herein relates, in general, to systems and methods for improving automatic stabilization of a vehicle when sliding, and, more particularly, to a stabilization system that can execute a timely clutch-kick to straighten a path of an oversteering vehicle.

BACKGROUND

Oversteer occurs when a vehicle turns into a sharper turn than the driver intends, resulting in the rear of the vehicle thrusting outwardly of the bend and causing the rear of the car to start to slide due to the rear tires losing lateral traction. This type of event is often considered a dangerous condition for a vehicle to be in and frequently results in the vehicle spinning out of control.

SUMMARY

The disclosed systems and methods provide enhanced stability recovery from oversteering, and in some instances, enhanced and rapid obstacle avoidance by automatically executing a clutch kick maneuver when a hazard state is detected.

In one embodiment, a stabilization system includes a sensor to generate sensor data indicating one or more aspects of a turning condition of the vehicle in an environment of the vehicle. The stabilization system further includes a processor and a memory, communicably connected to the one or more processors, storing: a detection module including instructions that, when executed by the processor, cause the processor to detect a turning condition of the vehicle based at least in part on the sensor data and determine that a hazard state exists based on a comparison of one or more parameters of the turning condition against one or more predetermined thresholds, and a clutch kick module including instructions that, when executed by the processor, cause the processor to execute a clutch kick in response to the hazard state. The clutch kick includes disengaging the clutch and rapidly reengaging the clutch.

In another embodiment, a method for controlling a vehicle includes obtaining data indicating one or more aspects of a turning condition of the vehicle, detecting that a hazard state exists based on a comparison of one or more parameters of the turning condition against one or more predetermined thresholds, and executing a clutch kick in response to detecting the hazard state. The clutch kick includes disengaging the clutch and rapidly reengaging the clutch.

In another embodiment, a non-transitory computer-readable medium for controlling a vehicle includes instructions that, when executed by one or more processors, cause the one or more processors to obtain data indicating one or more aspects of a turning condition of the vehicle, detect that a hazard state exists based on a comparison of one or more parameters of the turning condition against one or more predetermined thresholds, and execute a clutch kick in response to detecting the hazard state. The clutch kick includes disengaging the clutch and rapidly reengaging the clutch.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
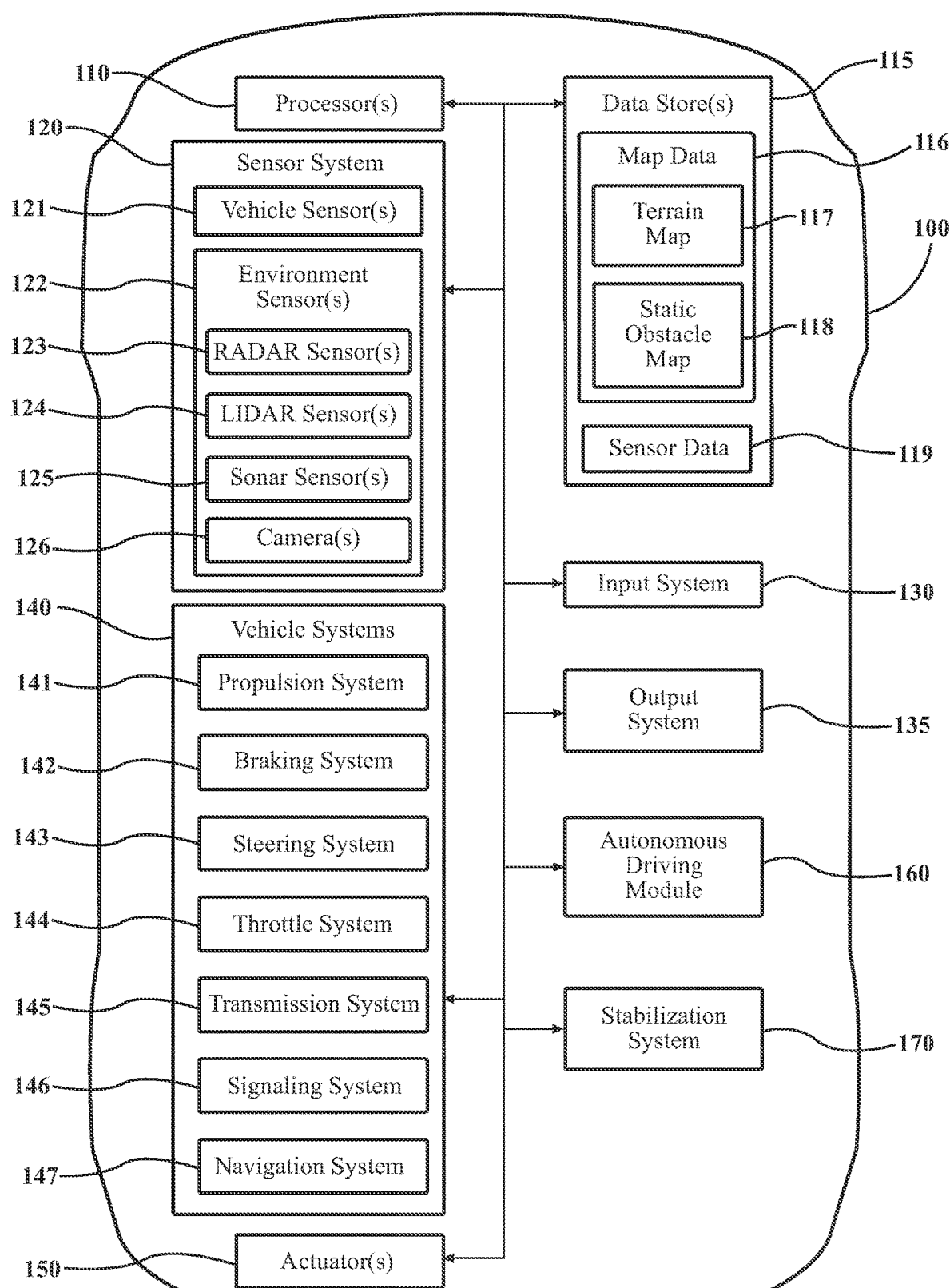
FIG. 1 illustrates one embodiment of a vehicle within which systems and methods disclosed herein may be implemented.

Systems, methods, and embodiments associated with controlling a vehicle to execute a clutch kick for stabilization or obstacle avoidance are disclosed. In one or more embodiments, in a vehicle with front-wheel drive the disclosed embodiments can control one or more vehicle systems, such as the clutch and throttle, to automatically implement the clutch kick as a stabilization mechanism during an oversteer event or as an avoidance mechanism when a vehicle turn trajectory indicates a potential collision with an obstacle.

Internal combustion engines have inherent limitations on maximum torque production and quick torque output changes. The difficulty of quickly changing torque output is particularly pronounced in turbocharged applications where boost pressure must be created before max torque production is possible. In vehicles with a clutch, whether manual or automated in the drivetrain, clutch control can be used to partially overcome these limitations and in certain circumstances improve stability control.

As used herein, a clutch kick may be defined as a momentary release of the clutch followed by a rapid reengagement of the clutch. In one or more embodiments, a clutch kick can include one or more of increasing the throttle (e.g., 100%) while the clutch is disengaged, upshifting gears while the clutch kick is disengaged, or applying brakes prior to reengaging the clutch. Executing a clutch kick enables the vehicle to rapidly increase engine revolutions per minute (RPM) and then transfer that momentum to the driven wheels more quickly than would otherwise be possible.

In one or more embodiments, a stabilization system that can execute a timely clutch kick to achieve stability or obstacle avoidance is disclosed. The disclosed stabilization system can detect when a front-wheel drive vehicle is entering a spin (e.g., due to oversteering) and can control relevant vehicle systems to automatically execute a clutch kick and achieve a burst of longitudinal drive force that can rapidly straighten the vehicle. The disclosed stabilization system can reduce potentially destabilizing lateral forces from the front tires of the vehicle and shift the vehicle load to the rear tires to further stabilize the vehicle.

The disclosed approach is especially useful when steering control is unavailable or the vehicle drive unit is not powerful enough to break traction on the front tires. Conventional electronic stability control (ESC) systems typically utilize the brakes in this situation. However, as vehicle sideslip grows, brakes become less effective. In contrast, the disclosed stabilization system uses drive torque, which can achieve successful results even when other actuators (e.g., brakes and steering) are ineffective.

Furthermore, beyond controlling yaw, the disclosed stabilization system can also perform obstacle avoidance during automated or assisted driving. For example, the disclosed stabilization system may utilize a burst of longitudinal force to temporarily straighten the path of the vehicle while driving in order to avoid a collision with an obstacle.

Referring to FIG. 1, an example of a vehicle 100 is illustrated. As used herein, a "vehicle" is any form of powered transport. In one or more implementations, the vehicle 100 is a front-wheel drive automobile. While arrangements will be described herein with respect to automobiles, it will be understood that embodiments are not limited to automobiles. In some implementations, the vehicle 100 may be any form of powered, multi-wheeled transport or vehicle that can benefit from the functionality discussed herein.

As shown in FIG. 1, the vehicle 100 includes multiple elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 2, 3A-3C, 4A-4C, and 5 for purposes of brevity in this description. It will be appreciated that for simplicity and clarity of illustration, where appropriate, reference numerals have been repeated among the different figures to indicate corresponding or analogous elements. In addition, while the discussion outlines numerous specific details to provide a thorough understanding of the embodiments described herein, those of skill in the art, will understand that the embodiments described herein may be practiced using various combinations of these elements.

In any case, the vehicle 100 includes a stabilization system 170 that functions to automatically execute a clutch kick to stabilize the vehicle 100 and/or cause the vehicle 100 to avoid a collision with an obstacle. Moreover, while depicted as a standalone component, in one or more embodiments, the stabilization system 170 can be integrated with another component of the vehicle 100, such as the autonomous driving module 160 or other drive control system of the vehicle 100. The noted functions and methods will become more apparent in the following discussion of the figures.

As will also be discussed further below, the vehicle 100 includes one or more environment sensors 122, and various vehicle systems 140 including a braking system 142, a throttle system 144, and a transmission system 145. The transmission system 145 may include a drivetrain having a shared clutch control or an automated manual transmission. The transmission system 145 generally adapts the output of an engine to drive the wheels. As used herein, a clutch generally refers to a torque transfer device in the transmission system 145 which, when in an engaged state, transfers torque that is carried along a torque transfer path from a transmission input member connected to the engine to a transmission output member connected to the wheels.

Figure 2:
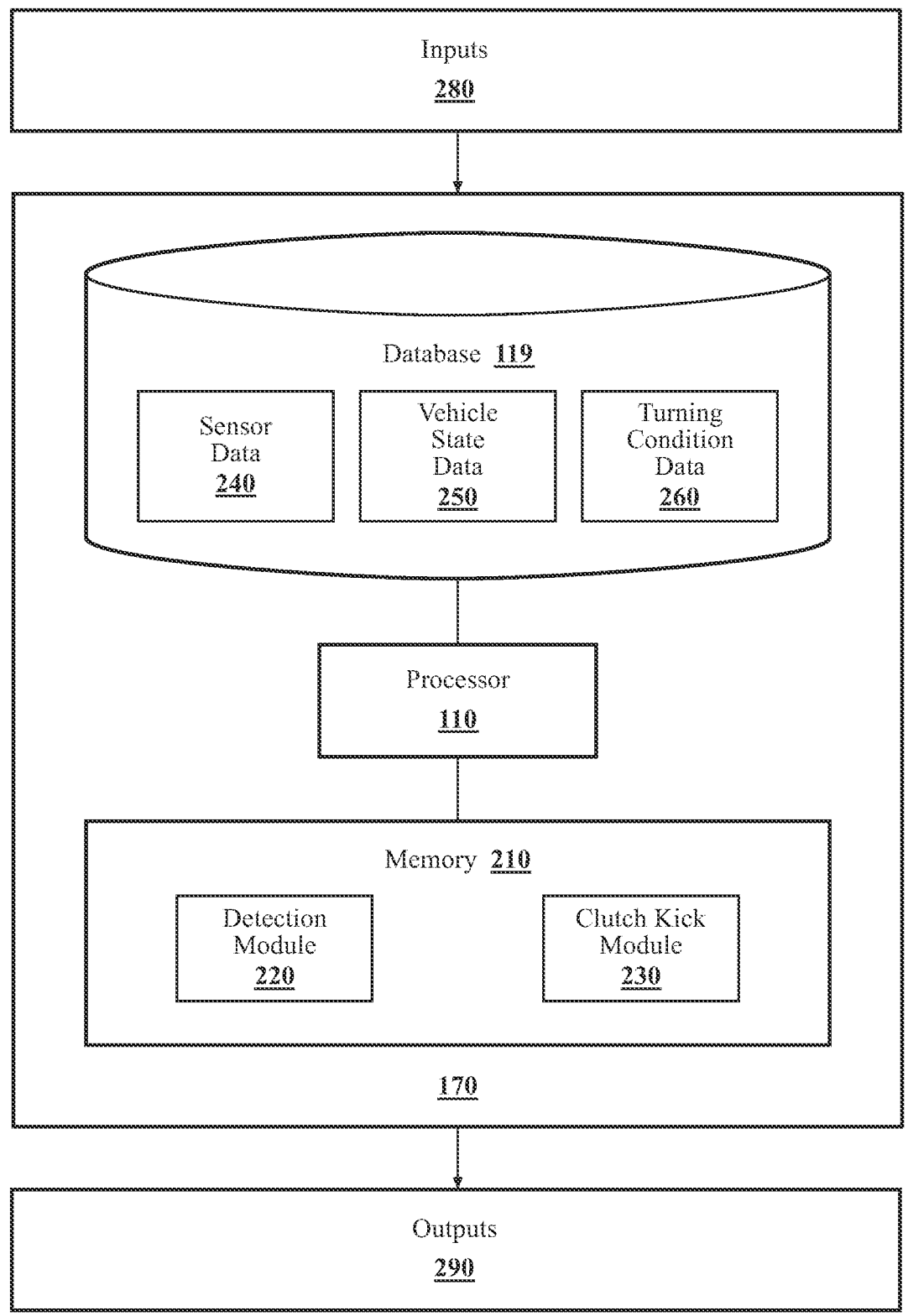
FIG. 2 illustrates one embodiment of a stabilization system according to the disclosed embodiments.

With reference to FIG. 2, one embodiment of the stabilization system 170 of FIG. 1 is illustrated. The stabilization system 170 is shown as including the processor 110 and the database 119 from the vehicle 100 of FIG. 1. Accordingly, the processor 110 may be a part of the stabilization system 170, the stabilization system 170 may include a processor separate from the processor 110 of the vehicle 100 or the stabilization system 170 may access the processor 110 through a data bus or another communication path.

The stabilization system 170 includes the database 119 that stores, among other things, sensor data 240 (e.g., data received from the environment sensors 122), vehicle state data 250 (e.g., data received from one or more vehicle systems 140, such as the steering system 143, the throttle system 144, and the transmission system 145 indicating a vehicle state) and turning condition data 260 (e.g., data that indicate one or more aspects of a turning event of the vehicle 100), as will be discussed further below. The database 119, in one embodiment, is constructed as an electronic data structure stored in the memory 210 or another data store, such as the vehicle 100 data store 115, a cloud-based storage, a removable memory device, or another suitable location that is accessible to the modules 220 and 230. The database 119 is configured with routines that can be executed by the processor 110 for analyzing stored data, providing stored data, organizing stored data, and so on. Thus, in one embodiment, the database 119 stores data described above (as well as other data) used by the modules 220 and 230 in executing various functions.

Additionally, the stabilization system 170, in one or more embodiments, includes the memory 210 that stores a detection module 220 and a clutch kick module 230. The memory 210 can be constructed as a random-access memory (RAM), a read-only memory (ROM), a hard-disk drive, a flash memory, or other suitable memory for storing the modules 220 and 230. The modules 220 and 230 are, for example, constructed as computer-readable instructions that when executed by the processor 110 cause the processor 110 to perform the various functions disclosed herein.

The stabilization system 170 can receive various inputs 280 and process and/or store the inputs 280, for example, as sensor data 240 and vehicle state data 250. The stabilization system 170 can generate outputs 290, for example, actuation commands to the throttle system 144 and the transmission system 145.

The detection module 220 is generally constructed including instructions that function to control the processor 110 to obtain turning condition data 260 indicating one or more aspects of a turning of the vehicle 100 and determine that a hazard state exists based on a parameter of the turning condition data 260 exceeding a predetermined threshold. In one or more embodiments, the detection module 220 can obtain the turning condition data 260 based in part on the sensor data 240 and/or the vehicle state data 250.

As will be discussed further below, the sensor data 240 can include data generated by the environment sensor(s) 122, such as data indicating a position of the vehicle 100 within a turning lane, a presence of an obstacle (e.g., another vehicle), etc. The vehicle state data 250 include data indicating a state of the vehicle 100 (e.g., accelerating, braking, turning, autonomous driving, etc.) and may be received from any of the various vehicle systems 140 or other systems operating in the vehicle 100, such as the autonomous driving module 160.

Generally, a 'hazard state' as referred to herein represents a set of one or more conditions associated with turning the vehicle 100 that, when true, can result in a situation wherein the vehicle 100 is subjected to significantly increased risk of loss of control or a collision. For example, in one or more embodiments the detection module 220 can define an oversteer of the vehicle 100 exceeding a predetermined threshold as a hazard state. As another example, in one or more embodiments the detection module 220 can define a hazard state as when a projected trajectory of the vehicle 100 (e.g., based on the vehicle state data 250 and/or the turning condition data 260) intersects an obstacle indicated in the sensor data 240.

The clutch kick module 230 is generally constructed including instructions that function to control the processor 110 to execute a clutch kick in response to the hazard state. The clutch kick is defined as comprising disengaging the clutch and rapidly reengaging the clutch. In one or more embodiments, the clutch kick further comprises increasing throttle of the vehicle 100 while the clutch is disengaged. In one or more embodiments, the clutch kick further comprises actuating a gear up-shift while the clutch is disengaged. In one or more embodiments, the clutch kick further comprises activating brakes of the vehicle 100 prior to reengaging the clutch.

Figure 3A:
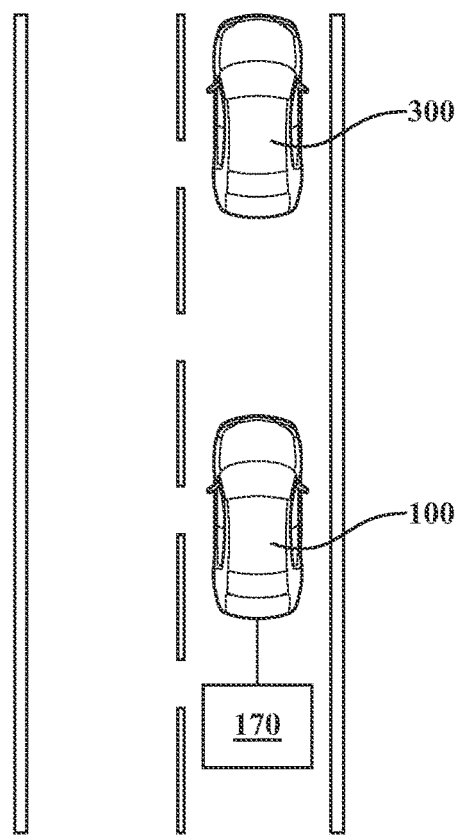
FIG. 3A illustrates an example of a vehicle initiating a turn according to the disclosed embodiments.
Figure 3B:
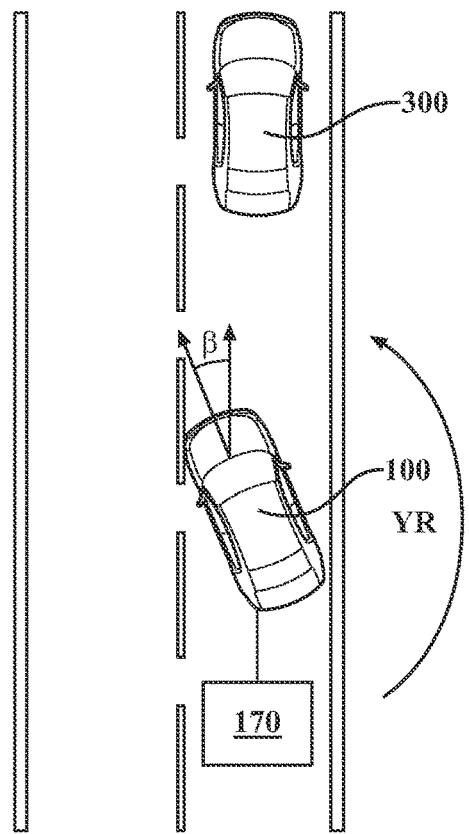
FIG. 3B illustrates an example scenario of the vehicle losing traction according to the disclosed embodiments.
Figure 3C:
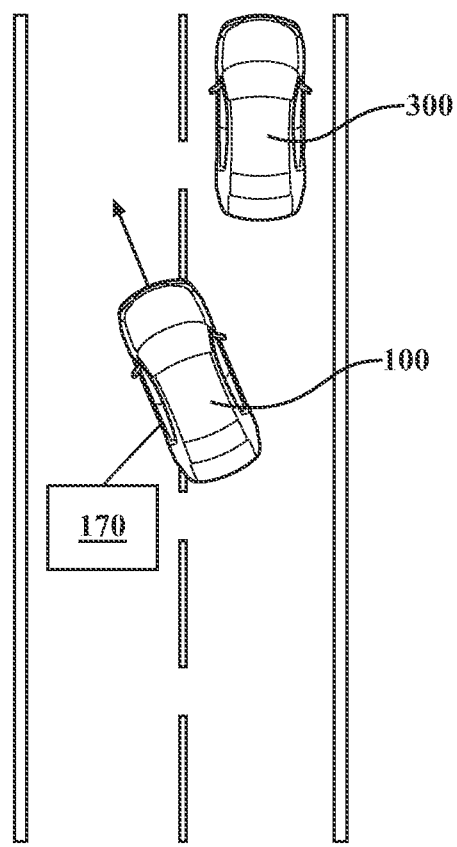
FIG. 3C illustrates an example of a stabilization system executing a clutch kick to stabilize the vehicle, according to the disclosed embodiments.

FIGS. 3A-3C illustrate an example scenario in which the disclosed stabilization system 170 can detect a hazard state due to oversteering and execute a clutch kick in response to the hazard state in order to regain control of the vehicle 100.

FIG. 3A illustrates the vehicle 100 initiating a left turn to change lanes in preparation for passing vehicle 300. However, as illustrated in FIG. 3B the rear wheels of the vehicle 100 begin to lose lateral traction and the vehicle 100 enters an oversteer.

In an oversteering event, the slip angle of the rear wheels of the vehicle 100 is greater than the slip angle of the front wheels. This condition results in the rear of the vehicle 100 sliding outwards in a curve. In one or more embodiments, the disclosed stabilization system 170 (e.g., detection module 220) can identify when oversteering is occurring by obtaining samples of the sensor data 240 and/or the vehicle state data 250 that indicate a turning condition of the vehicle 100, storing and processing the samples as the turning condition data 260, and comparing a factor of the turning condition data 260 against a predetermined threshold. The turning condition data 260 can include one or more factors, such as yaw rate, velocity, slip angle, lateral acceleration, etc., of the vehicle 100. Depending on available sensor data 240 and vehicle state data 250, the detection module 220 can select one or more factors of the turning condition data 260 to determine whether the vehicle 100 has entered a hazard state due to oversteering.

For example, in one or more embodiments the detection module 220 can determine an intended yaw rate and an actual yaw rate of the vehicle 100 as part of the turning condition data 260. When the actual yaw rate (YR) exceeds the intended yaw rate by a predetermined threshold amount, the detection module 220 can determine that the vehicle 100 has entered a hazard state due to oversteering.

As another example, the detection module 220 can determine a sideslip slip angle ($\beta$) of the vehicle 100 as part of the turning condition data 260. When $\beta$ exceeds a predetermined angle threshold, the detection module 220 can determine that the vehicle 100 has entered a hazard state due to oversteering.

In one or more embodiments, the detection module 220 can compare combinations of factors of the turning condition data 260 against thresholds to determine whether the vehicle 100 has entered a hazard state.

When the detection module 220 determines that the vehicle 100 has entered a hazard state due to oversteering, the clutch kick module 230 executes an automated clutch kick by momentarily disengaging the clutch and reengaging the clutch to rapidly straighten the vehicle 100. The clutch kick reduces potentially destabilizing lateral forces from the front tires and shifts the load to the rear tires to further stabilize the vehicle 100. When the clutch kick module 230 reengages the clutch, the vehicle 100 receives a burst of force that thrusts the vehicle 100 forward, as shown in FIG. 3C, pulling the vehicle 100 out of the oversteer.

In one or more embodiments, the clutch kick module 230 can execute different variations of a clutch kick depending on the circumstances as indicated by the sensor data 240 and the vehicle state data 250. Different types of enhanced clutch kicks may be more effective in different situations. For example, when a tire is completely sliding, the direction of force it generates is very closely opposite its direction of slip. When the vehicle 100 is slipping in extreme, the amount of longitudinal force the vehicle 100 can generate is not limited by the torque output of the engine, but by the maximum speed the vehicle 100 can spin the wheels.

Accordingly, in one or more embodiments the detection module 220 can determine the hazard state at any of multiple levels (e.g., a low hazard state, a high hazard state, etc.) indicating a degree of oversteer and risk of accident. When the detection module 220 determines that a high hazard state exists (e.g., extreme slipping), the clutch kick module 230 can execute an enhanced clutch kick by upshifting the transmission while the clutch is disengaged to allow spinning the front wheels faster, resulting in more longitudinal force and further reducing the lateral force.

As another example of an enhanced clutch kick, in one or more embodiments the clutch kick module 230 can increase the throttle (e.g., 100%) while the clutch is disengaged to produce a rapid increase in RPM.

As yet another example of an enhanced clutch kick, in one or more embodiments the clutch kick module 230 can activate brakes or a separate oversteer mitigation system (such as an electronic stability control system) prior to reengaging the clutch. This enhancement can increase effectiveness of the clutch kick in a front wheel drive vehicle 100. Disengaging the clutch could temporarily reduce wheel torque and worsen the oversteer. Using other actuators during this preparation phase reduces or eliminates this risk.

Figure 4A:
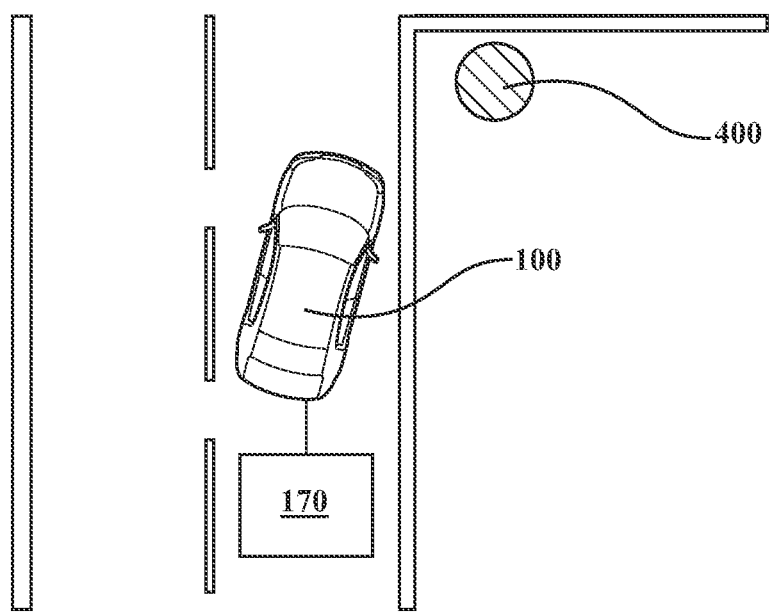
FIG. 4A illustrates an example scenario of a vehicle initiating a turn at a corner of an intersection according to the disclosed embodiments.
Figure 4B:
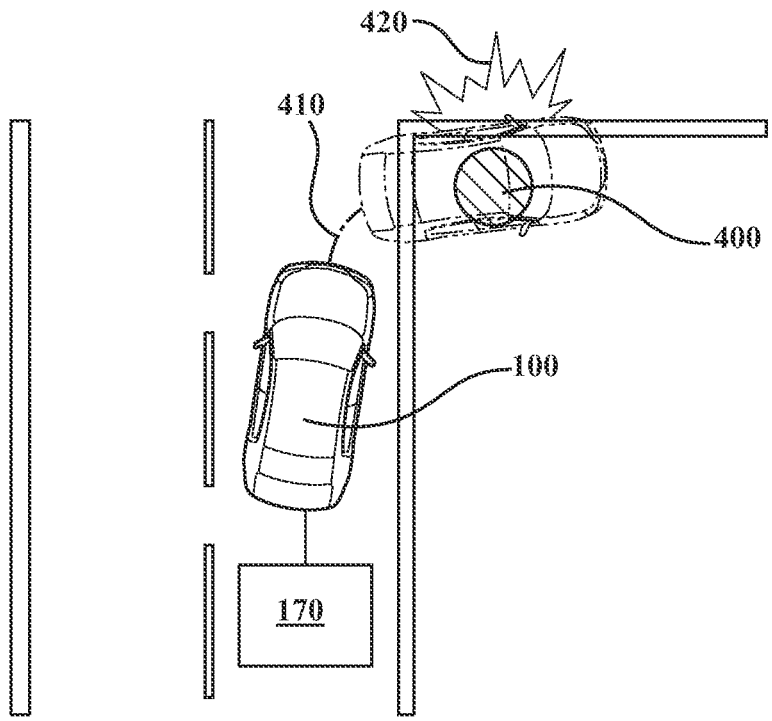
FIG. 4B illustrates an example scenario of a stabilization system determining that a projected trajectory of the vehicle intersects with an obstacle, according to the disclosed embodiments.
Figure 4C:
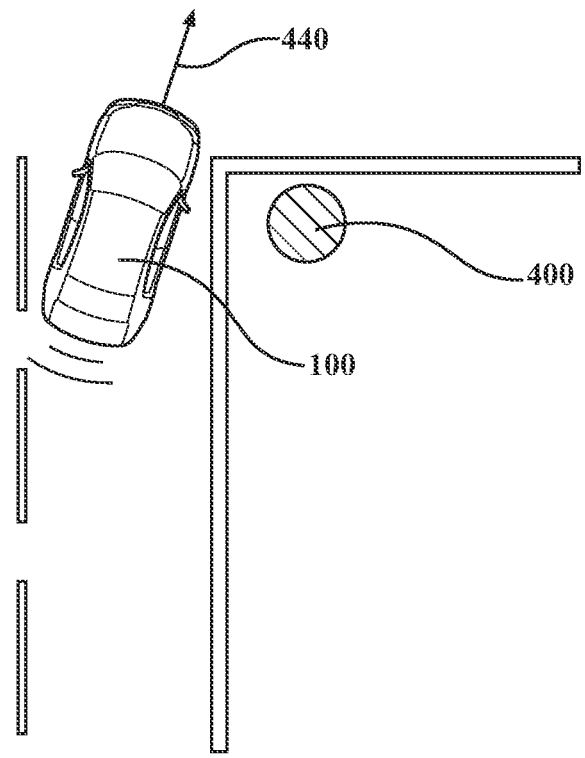
FIG. 4C illustrates an example scenario of the stabilization system executing a clutch kick to stabilize the vehicle and avoid the obstacle, according to the disclosed embodiments.

In addition to stabilizing the vehicle 100 to avoid spinout, the disclosed stabilization system 170 can execute a clutch kick to avoid a collision in certain circumstances. FIGS. 4A-4C illustrate an example scenario in which the disclosed stabilization system 170 can detect a hazard state due to a predicted turn trajectory intersecting an obstacle and execute a clutch kick in response to the hazard state in order to avoid a collision with the obstacle.

FIG. 4A illustrates the vehicle 100 initiating a turn at a corner of an intersection. Based on the sensor data 240, the disclosed stabilization system 170 (e.g., the detection module 220) detects an obstacle 400 in a vicinity of the vehicle 100.

FIG. 4B illustrates the disclosed stabilization system 170 (e.g., the detection module 220) determining a predicted turn trajectory 410 of the vehicle 100 based on the turning condition data 260. In this instance, due to a slight oversteer the predicted turn trajectory 410 intersects with the obstacle 400, which would result in a projected collision 420.

FIG. 4C illustrates the disclosed stabilization system 170 (e.g., the clutch kick module 230) executing a clutch kick to quickly force the vehicle 100 forward on a new trajectory 440 that avoids the obstacle 400.

Accordingly, the disclosed stabilization system 170 can utilize the clutch kick to use the limited tire traction available during an oversteer event to produce a longitudinal force or even a longitudinal slip that, in either case, reduces a lateral slip and therefore contributes to stabilizing the vehicle 100 in a forward thrust. Additional and optional features of the stabilization system 170 and example methods of implementation will be discussed below.

Figure 5:
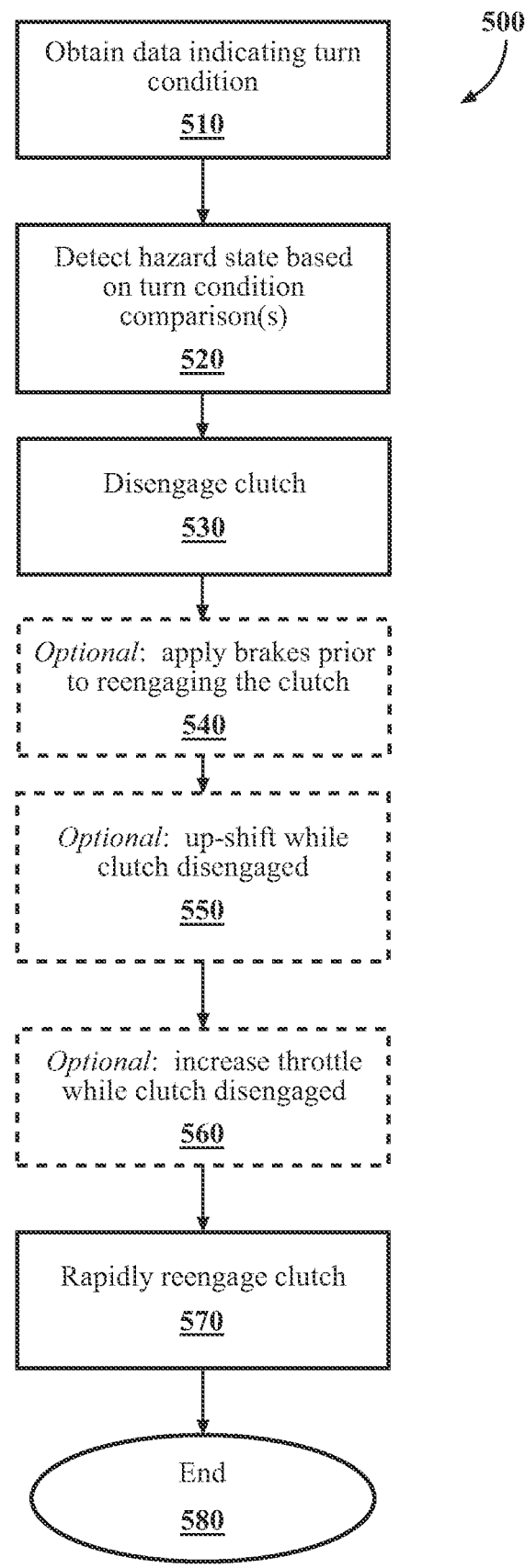
FIG. 5 illustrates an example flowchart of operations of a stabilization system, according to the disclosed embodiments.

FIG. 5 illustrates a flowchart of a method 500 of generating an ego-motion estimate according to the disclosed embodiments. The method 500 will be discussed from the perspective of the stabilization system 170 of FIGS. 1 and 2. While the method 500 is discussed in combination with the stabilization system 170, it should be appreciated that the method 500 is also not limited to being implemented within the stabilization system 170 but is instead one example of a system that may implement the method 500.

At an operation 510, the stabilization system 170 (e.g., the detection module 220) obtains data indicating one or more aspects of a turning condition of the vehicle 100. For example, in one or more embodiments the detection module 220 obtains the sensor data 240 generated by the environment sensor(s) 122 and the vehicle state data 250 generated by the vehicle systems 140. The detection module 220 identifies and processes relevant samples that indicate a turning condition of the vehicle 100 and stores the information as the turning condition data 260. Here, processing can refer to executing calculations and/or algorithms to derive information from the data samples, such as calculating a yaw rate (actual/intended), slip angle, etc.

At an operation 520, the stabilization system 170 (e.g., the detection module 220) detects that a hazard state exists based on a comparison of one or more parameters of the turning condition data 260 against one or more predetermined thresholds. For example, in one or more embodiments the detection module 220 can determine a difference between an actual yaw rate and an intended yaw rate as a parameter of the turning condition, compare the difference against a predetermined threshold, and determine that a hazard state exists when the difference exceeds the predetermined threshold. In one or more embodiments, the detection module 220 can determine that a hazard state exists when multiple parameters of the turning condition exceed corresponding predetermined thresholds. Furthermore, in one or more embodiments the detection module 220 can input one or more turning condition parameters into a machine learning algorithm (e.g., a neural network) configured to output a hazard state estimation value that indicates a level of a hazard state.

In one or more embodiments, the detection module 220 can determine that a hazard state exists by determining that a projected trajectory of the vehicle 100, based on the turning condition data 260, intersects an obstacle detected in the sensor data 240 by a threshold amount that indicates a likelihood of collision between the vehicle 100 and the obstacle.

At an operation 530, the stabilization system 170 (e.g., the clutch kick module 230) controls an actuator of the vehicle clutch to disengage the clutch, thereby initiating execution of a clutch kick in response to the hazard state. The clutch kick, as executed by the clutch kick module 230, generally includes disengaging the clutch and rapidly reengaging the clutch (i.e., at an operation 570). In various situations the clutch kick module 230 can execute one or more different variations of the clutch kick.

For example, at an operation 540, in one or more embodiments the clutch kick, as executed by the clutch kick module 230, optionally includes applying the brakes prior to reengaging the clutch, e.g., to further stabilize the vehicle 100. The clutch kick module 230 can control an actuator to control the brakes directly or can activate an electronic stability control system (ESC) to control the brakes prior to reengaging the clutch. In one or more embodiments, this operation can be executed prior to, simultaneously with, or subsequent to, disengaging the clutch (i.e., the operation 530).

At an operation 550, in one or more embodiments the clutch kick, as executed by the clutch kick module 230, optionally includes up-shifting while the clutch is disengaged. In one or more embodiments the clutch kick module 230 can control an actuator to shift gears while the clutch is momentarily disengaged.

At an operation 560, in one or more embodiments the clutch kick, as executed by the clutch kick module 230, optionally includes increasing the throttle while the clutch is disengaged.

In one or more embodiments, the clutch kick module 230 can execute a clutch kick that includes a combination of optional features as discussed in the operations 540-560. In one or more embodiments, the clutch kick module 230 can determine which optional features to implement based at least in part on the level of hazard state that is determined to exist at the time of the clutch kick.

For example, in a high-level hazard state indicating a complete or nearly complete loss of traction, the clutch kick module 230 can execute a clutch kick that includes all of the optional features as discussed in the operations 540-560. Conversely, in a low-level hazard state indicating oversteering without complete loss of control, the clutch kick module 230 can execute a basic clutch kick (e.g., increase the throttle while the clutch is disengaged) or none of the optional features discussed in the operations 540-560.

At an operation 570, the stabilization system 170 (e.g., the clutch kick module 230) controls an actuator of the vehicle clutch to reengage the clutch.

The method 500 ends with completion of executing the clutch kick at an operation 580.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 (FIG. 2) and can further include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area. In one or more embodiments, the detection module 220 can determine that a hazard state exists based on a predicted trajectory of the vehicle 100 intersecting with a static obstacle represented in the static obstacle map(s) 118 beyond a threshold amount that indicates a likelihood of a collision between the vehicle 100 and the static obstacle.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles) and store the data as sensor data 240.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself, such as one or more actual states of the vehicle 100 as discussed above. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126, e.g., one or more monocular cameras. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger).

The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed. One or more of these systems can by operably connected to wheels of the vehicle in a manner that allows individual application of control or commands implemented by the respective system.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the stabilization system 170, and/or the autonomous driving module(s) 160 can be operatively connected to communicate with the various vehicle systems 140 and/or individual components thereof. For example, returning to FIG. 1, the processor(s) 110, the stabilization system 170, and/or the autonomous driving module(s) 160 can be in communication to send and/or receive information from the various vehicle systems 140 to control the movement, speed, maneuvering, heading, direction, etc. of the vehicle 100. The processor(s) 110, the stabilization system 170, and/or the autonomous driving module(s) 160 may control some or all of these vehicle systems 140 and, thus, may be partially or fully autonomous.

The processor(s) 110, the stabilization system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) 110, the stabilization system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities. The stabilization system 170 can determine one or more actuation commands for one or more of the actuators 150, e.g., to control the clutch, brakes and/or throttle, as discussed above.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the stabilization system 170 can be configured to determine travel path(s) and determine current autonomous driving maneuvers for the vehicle 100, future autonomous driving maneuvers and/or modifications to current autonomous driving maneuvers based on data acquired by the sensor system 120 and/or stabilization system 170, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A stabilization system for a vehicle having a clutch, comprising:
   a sensor configured to generate sensor data indicating one or more aspects of a turning condition of the vehicle in an environment of the vehicle;
   a processor; and
   a memory, communicably connected to the one or more processors, storing:
      a detection module including instructions that, when executed by the processor, cause the processor to detect a turning condition of the vehicle based at least in part on the sensor data and determine that a hazard state exists based on a comparison of one or more parameters of the turning condition against one or more predetermined thresholds, and
      a clutch kick module including instructions that, when executed by the processor, cause the processor to execute a clutch kick in response to the hazard state, wherein the clutch kick comprises disengaging the clutch and rapidly reengaging the clutch and actuating a gear up-shift while the clutch is disengaged.

2. The stabilization system of claim 1, wherein the hazard state comprises an oversteer of the vehicle.

3. A stabilization system for a vehicle having a clutch, comprising:
   a sensor configured to generate sensor data indicating one or more aspects of a turning condition of the vehicle in an environment of the vehicle;
   a processor; and
   a memory, communicably connected to the one or more processors, storing:
      a detection module including instructions that, when executed by the processor, cause the processor to detect a turning condition of the vehicle based at least in part on the sensor data and determine that a hazard state exists based on a comparison of one or more parameters of the turning condition against one or more predetermined thresholds, wherein the hazard state comprises a projected trajectory of the vehicle intersecting an obstacle, and
      a clutch kick module including instructions that, when executed by the processor, cause the processor to execute a clutch kick in response to the hazard state, wherein the clutch kick comprises disengaging the clutch and rapidly reengaging the clutch.

4. The stabilization system of claim 1, wherein the clutch kick further comprises activating brakes of the vehicle prior to reengaging the clutch.

5. The stabilization system of claim 1, wherein the vehicle is a front-wheel drive vehicle.

6. The stabilization system of claim 1, wherein the clutch kick further comprises increasing a throttle of the vehicle while the clutch is disengaged.

7. A method for controlling a vehicle with a drivetrain having a clutch, comprising:
   obtaining data indicating one or more aspects of a turning condition of the vehicle;
   detecting that a hazard state exists based on a comparison of one or more parameters of the turning condition against one or more predetermined thresholds; and
   executing a clutch kick in response to detecting the hazard state;
   wherein the clutch kick comprises disengaging the clutch and rapidly reengaging the clutch and actuating a gear up-shift while the clutch is disengaged.

8. The method of claim 7, wherein the hazard state comprises an oversteer of the vehicle.

9. The method of claim 7, wherein the executing the clutch kick further comprises increasing a throttle of the vehicle while the clutch is disengaged.

10. The method of claim 7, wherein the executing the clutch kick further comprises activating brakes of the vehicle prior to reengaging the clutch.

11. The method of claim 7, wherein the one or more parameters of the turning condition is one or more of an intended yaw rate, an actual yaw rate, a slip angle or a lateral acceleration of the vehicle.

12. A method for controlling a vehicle with a drivetrain having a clutch, comprising:
   obtaining data indicating one or more aspects of a turning condition of the vehicle;
   detecting that a hazard state exists based on a comparison of one or more parameters of the turning condition against one or more predetermined thresholds, wherein the hazard state comprises a projected trajectory of the vehicle intersecting an obstacle, and executing a clutch kick in response to detecting the hazard state;

wherein the clutch kick comprises disengaging the clutch and rapidly reengaging the clutch.

13. A non-transitory computer-readable medium for controlling a vehicle with a drivetrain having a clutch, including instructions that, when executed by one or more processors, cause the one or more processors to:

obtain data indicating one or more aspects of a turning condition of the vehicle;

detect that a hazard state exists based on a comparison of one or more parameters of the turning condition against one or more predetermined thresholds; and execute a clutch kick in response to detecting the hazard state;

wherein the clutch kick comprises disengaging the clutch and rapidly reengaging the clutch and actuating a gear up-shift while the clutch is disengaged.

14. The non-transitory computer-readable medium of claim 13, wherein the hazard state comprises an oversteer of the vehicle.

15. The non-transitory computer-readable medium of claim 13, wherein the instructions to execute the clutch kick include instructions to increase a throttle of the vehicle while the clutch is disengaged.

16. The non-transitory computer-readable medium of claim 13, wherein the instructions to execute the clutch kick include instructions to activate brakes of the vehicle prior to reengaging the clutch.

17. A non-transitory computer-readable medium for controlling a vehicle with a drivetrain having a clutch, including instructions that, when executed by one or more processors, cause the one or more processors to:

obtain data indicating one or more aspects of a turning condition of the vehicle;

detect that a hazard state exists based on a comparison of one or more parameters of the turning condition against one or more predetermined thresholds, wherein the hazard state comprises a projected trajectory of the vehicle intersecting an obstacle; and execute a clutch kick in response to detecting the hazard state;

wherein the clutch kick comprises disengaging the clutch and rapidly reengaging the clutch.

* * * * *